UNITED STATES PATENT OFFICE 2,305,830

PREPARING AMINES OF PETROLEUM HYDROCARBONS

Elmar Profft, Berlin-Lichterfelde, Germany; vested in the Alien Property Custodian No Drawing. Application February 23, 1939, Serial No. 258,098. In Germany March 1, 1938

8 Claims. (Cl. 260—585)

This invention relates to a process for preparing amines of petroleum hydrocarbons.

It has already been proposed to treat chlorination products of hydrocarbons, including such with relatively long paraffin chains, with heterocyclic nitrogen bases in the hot, and in this way condensation products have been obtained which have proved to be very useful for numerous technical, more particularly textile, purposes.

According to the present process similarly useful technical products are prepared even from raw and purified mineral oil, e. g. in the form of so-called ordinary petroleum, by chlorinating the said mineral oil or petroleum with certain precautionary measures and thereupon converting the chlorination products to amines under certain conditions with ordinary ammonia. A useful chlorination product of mineral oil, e. g. of petroleum, containing paraffins of medium and higher molecular weight with preponderantly 10-14 carbon atoms, is treated with chlorine whilst cooling or at room temperatures, in any case below about 40° C., until 1 part by weight of petroleum has taken up 0.25 or 0.5 part, maybe even up to one part, by weight of chlorine. The interaction, which takes place slowly in the dark, may be accelerated by access of weakened sunlight or diffuse daylight or also by artificial illumination. The yellowish coloured oily chlorination products obtained are washed and dried. The mineral oil or petroleum slightly or strongly chlorinated in this way is now treated with ammonia in autoclaves for several hours under pressure and at elevated temperature of 150 to 170° C. Preferably an alcoholic ammonia solution is used which contains ammonia in excess beyond the calculated mol ratio. After the interaction and cooling down the hydrochlorides obtained of the bases formed are separated from alcohol and excess ammonia and then purified from the oily contaminating products by shaking out with water.

Alcohol and excess ammonia can be recovered by distillation. The hydrochlorides obtained in aqueous solution of the bases which form may be treated with caustic soda and the free amines separated in this way as a dark brown oil, which can be washed and dried.

Instead of ethyl alcohol other indifferent solvents may also be used which are capable of simultaneously dissolving ammonia and petroleum chloride to a considerable extent, such as for example methyl alcohol or acetone. The ammonia may also be introduced into the treatment autoclave in gaseous form.

The technical amines obtained in this way, and which may still contain chlorine according to the source of the petroleum and the method of carrying out the process, are suitable for use for many technical purposes. They may be converted into water-soluble salts by means of mineral acids and used in this form; thus the amines may be added for example to the sulphuric acid spinning baths of the viscose industry. The salts have a characteristic wetting and frothing power and consequently offer considerable advantages as textile auxiliaries in washing and the like.

*Example*

10 litres or about 7.8 kg. of American petroleum having a boiling point of 160-280° C. is treated with chlorine, maybe whilst cooling, and in any case below 40° C., until the weight has increased by 2 kg. The resulting yellowish coloured oily chlorination products, weighing 9.8 kg., are preferably twice washed, first of all with water and then with 1% soda solution. During the second soda treatment it is advisable to add 0.5% NaOH to the soda solution. Treatment is then effected with water and the product separated from the washing water and dried with calcium chloride. The chlorine content of the chlorinated petroleum is round about 19% by determination. 400 g. of the chlorination product are introduced into a stirring autoclave and 600 cc. of a solution of ammonia in denatured spirit are added, there being 140 g. of ammonia in one litre of spirit. The autoclave is closed, heated and then maintained for four hours at a temperature of 170° C. whilst stirring. After cooling down the reaction product is freed from excess ammonia and alcohol by distillation at water bath temperature. The oily residue is repeatedly shaken out with water. In order to obtain the mixture of the different alkylated bases, the aqueous extracts are collected and treated with caustic soda until they show an alkaline reaction when the free bases separate as a brown oil, are separated from the aqueous parts and then dried with dehydrated sodium sulphate.

Having now set forth the invention as required by the patent statutes, what is claimed is:

1. In the process of preparing amines of petroleum hydrocarbons wherein such hydrocarbons are chlorinated and then animated, the step which comprises conducting the said chlorination by treating a mineral oil, containing paraffins of medium and higher molecular weight, with chlorine while cooling and at a temperature below 40° C.

2. In the process of preparing amines of petroleum hydrocarbons wherein such hydrocarbons are chlorinated and then aminated, the step which comprises conducting the said chlorination by treating a mineral oil containing paraffins of medium and higher molecular weight, having preponderantly 10 to 14 carbon atoms in the molecule, with chlorine while cooling and at a temperature below 40° C.

3. In the preparation of amines of petroleum hydrocarbons, the process which comprises treating a mineral oil with chlorine while cooling and at a temperature below 40° C., and aminating the resulting mildly-chlorinated product by treating it with an excess of ammonia under pressure at temperatures ranging from about 150° to 170° C. and in the presence of an inert solvent which is capable of dissolving the ammonia and at least a substantial amount of the said chlorinated product.

4. The process of claim 3 wherein said inert solvent is methyl alcohol.

5. The process of claim 3 wherein said inert solvent is ethyl alcohol.

6. The process of claim 3 wherein said inert solvent is acetone.

7. In the preparation of amines of petroleum hydrocarbons, the process which comprises chlorinating a mineral oil comprising paraffins of medium and higher molecular weight, containing preponderantly hydrocarbons having 10 to 14 carbon atoms in the molecule, by treating said oil with chlorine while cooling and at a temperature below 40° C., and aminating the resulting mildly-chlorinated product by treating it with an excess of ammonia under pressure at temperatures ranging from about 150° to 170° C. in the presence of an inert solvent which is capable of dissolving the ammonia and at least a substantial amount of the said chlorinated product.

8. A new product suitable for use as a wetting and frothing agent which comprises the free hydrocarbon amines resulting from the chlorination of a mineral oil, containing preponderantly hydrocarbons having 10 to 14 carbon atoms in the molecule, by treatment with chlorine at a temperature below 40° C. followed by treatment of the chlorinated product with an excess of ammonia under pressure at a temperature within the range of about 150° to 170° C. in the presence of an inert solvent; said product being a dark brown oil which may contain a small amount of chlorine and being capable of conversion into water soluble salts by treatment with mineral acids, said salts having characteristic wetting and frothing power and being useful as textile auxiliaries in washing and spinning operations.

ELMAR PROFFT.